March 12, 1957

C. W. HEINLE ET AL 2,785,281

CAN OPENING KEY SOLDERING MACHINE

Filed Nov. 9, 1953

INVENTORS.
CARL W. HEINLE
RONALD E. J. NORDQUIST
KARL BOFINGER
BY *Charles H. Erne*
*Leland R. McCann*
*George W. Reiber*
ATTORNEYS March 12, 1957 C. W. HEINLE ET AL 2,785,281
CAN OPENING KEY SOLDERING MACHINE
Filed Nov. 9, 1953 5 Sheets-Sheet 4

INVENTORS
CARL W. HEINLE
RONALD E. J. NORDQUIST
KARL BOFINGER
BY Charles H. Erne
Leland R. McCann
George W. Reiber
ATTORNEYS March 12, 1957 C. W. HEINLE ET AL 2,785,281
CAN OPENING KEY SOLDERING MACHINE
Filed Nov. 9, 1953 5 Sheets-Sheet 5

INVENTORS
CARL W. HEINLE
RONALD E. J. NORDQUIST
KARL BOFINGER
BY Charles H. Ernst
Leland R. McCann
George W. Reiber
ATTORNEYS

United States Patent Office 2,785,281
Patented Mar. 12, 1957

2,785,281

CAN OPENING KEY SOLDERING MACHINE

Carl W. Heinle, East Orange, and Ronald E. J. Nordquist, Maplewood, N. J., and Karl Bofinger, Cincinnati, Ohio, assignors to American Can Company, New York, N. Y., a corporation of New Jersey Application November 9, 1953, Serial No. 391,034

13 Claims. (Cl. 219—85)

The present invention relates to machines for attaching can opening keys to can or container ends or covers and has particular reference to devices for securely soldering the keys in a predetermined position on the ends or covers.

An object of the invention is the provision of a machine for attaching keys to can ends wherein the keys are attached in a predetermined position on the can ends while the latter travel along a predetermined path in processional order so as to provide for smooth high speed operation.

Another object is the provision of such a machine wherein the keys deposited on the advancing can ends for attachment thereto are held in proper place magnetically to insure against displacement of the keys during the soldering operation and during a subsequent cooling operation which is provided to rapidly harden the solder and thereby produce a strong solder bond between the key and the can end to permanently retain the key in place.

Another object is the provision in such a machine of key soldering devices wherein opposed soldering electrodes contact the same face of the key to effect the soldering operation and wherein the electrodes are yieldably mounted so as to facilitate accessibility to the work and to insure uniform contact therewith to produce proper soldering of the keys to the can ends.

Another object is the provision in such a machine of testing devices wherein the strength of the solder bond is tested to insure against subsequent loss of the key from the can end due to an insufficient solder bond.

Numerous other objects and advantages of the invention will be apparent as it is better understood from the following description, which, taken in connection with the accompanying drawings, discloses a preferred embodiment thereof.

Referring to the drawings.

As a preferred or exemplary embodiment of the instant invention the drawings disclose a machine for soldering can opening keys A (Fig. 13) to irregular shaped covers or end members B (Fig. 1) used on ham cans or containers although the invention is equally well adapted to any other shaped can end or can part. In some cases a shallow depression is provided in the can cover B to receive the key in a recessed relation. This recessed relation, however, has nothing to do with the invention and therefore is not shown in the drawings.

The key A preferably is formed with a shank D (Fig. 13) having a loop head or handle E at one end and an offset soldering tab F at the other. The soldering tab F preferably is provided with a small aperture G containing a predetermined amount of wire or pellet solder H to be used in attaching the tab F to a can end B to secure the key in place. Such a key is shown in United States Patent 1,936,018 issued November 21, 1933, to W. W. Hodgson on Method of Attaching Keys to Containers.

In the machine of the instant invention the can ends B are advanced along a horizontal straight line path of travel intermittently in a horizontal position and in spaced and timed processional order. At a station R (Fig. 1), a solder fluxed key A is deposited in a predetermined position on top of a can end B fed into the station. The can end B with its positioned key A is next advanced into an idle station S. This is followed by an advancement of the can end and its superposed key into a soldering station T where the key is attached to the can end. After this assembly of key to can end, they are advanced into an idle station U and thence into a testing station V where the strength of the solder bond is tested to insure secure attachment of the key. The can end with its attached key is then discharged from the machine to any suitable place of deposit.

Figure 1:
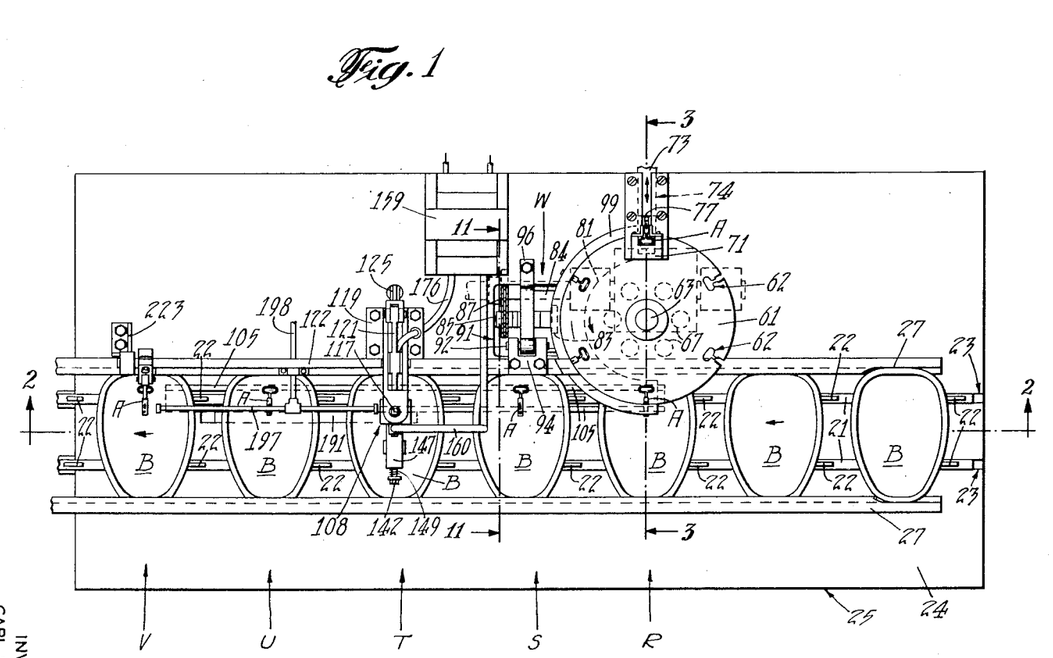
Figure 1 is a top plan view of a key soldering machine embodying the instant invention, with parts broken away.
Figure 2:
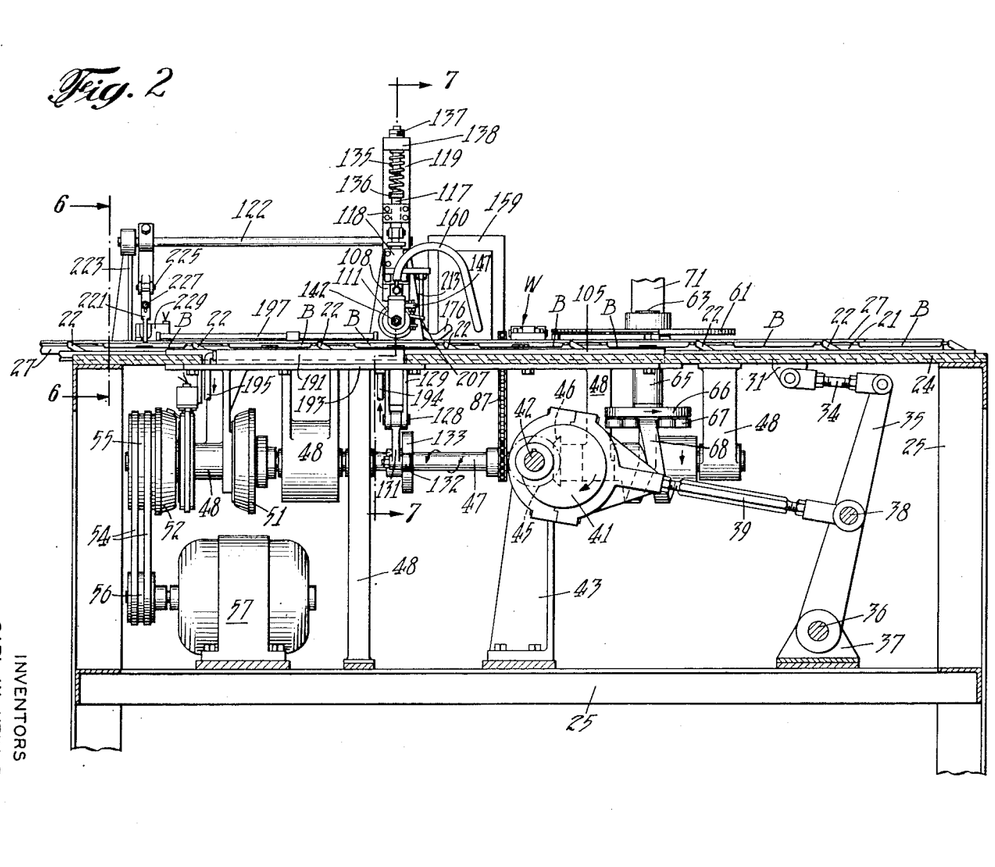
Fig. 2 is a longitudinal section taken substantially along the line 2—2 in Figure 1, with parts broken away.

Advancement of the can ends B (from right to left as seen in Figs. 1 and 2) through the machine preferably is effected by a pair of spaced and parallel reciprocable feed bars 21 (Figs. 1, 2 and 3) carrying spaced spring held depressible feed dogs 22 for engagement behind the rear edge of the can ends B. The feed bars 21 extend substantially the full length of the machine and operate in a pair of spaced and parallel longitudinal T slots 23 (see also Fig. 12) formed in a table 24 of a frame 25 which constitutes the main frame of the machine.

During their advancement through the machine, the can ends B are supported in a pair of spaced and parallel grooved guide rails 27 which extend the full length of the machine and which are secured to the top of the table 24, one on each side of the pair of feed bars 21.

Reciprocation of the feed bars 21 through a feeding stroke (toward the left in Fig. 1) and thence through a return stroke (toward the right in Fig. 1) to propel the can ends B intermittently through the machine is effected in unison, preferably by an eccentric motion. For this purpose each of the feed bars 21 is formed with an actuating lug 31 (Figs. 2 and 11) which extends down through a slot 32 formed under each feed bar in the table 24. The two lugs 31 are connected by two links 34 to the upper ends of two upright actuating arms 35 mounted on a common pivot shaft 36 carried in a pair of spaced bearings 37 secured to the frame 25.

The two actuating arms 35, intermediate their lengths are tied together for movement in unison by a short cross-shaft 38 (Figs. 2 and 11) which serves as a pivot shaft for one end of an eccentric rod 39. The opposite strap end of the rod surrounds an eccentric 41 which is mounted on a continuously rotating shaft 42 journaled in a pair of spaced bearing brackets 43 secured to the machine frame 25. One end of the eccentric shaft 42 carries a bevel gear 45 which meshes with and is driven by a bevel gear 46 mounted on a main driving shaft 47 extending longitudinally of the machine and journaled in several spaced bearing brackets 48 secured to the machine frame 25.

The main driving shaft 47 preferably is equipped with an electromagnetic brake 51 and an electromagnetic clutch 52 which are commercial items of the type disclosed in United States Patent 2,507,573 issued May 16, 1950, to J. G. Oetzel on Electromagnetic Friction Device. The shaft is rotated continuously through endless drive belts 54 operating over a driven pulley 55 on the electromagnetic clutch 52 and a driving pulley 56 on the rotor shaft of an electric motor 57 secured to the machine frame 25.

The keys A to be soldered to the can ends B are fed individually, from any suitable source of supply, into the station R to meet the can ends by a horizontally disposed rotatable disc 61 (Figs. 1, 2, 3, 4 and 5). The outer marginal edge portion of the disc overlaps the path of travel of the can ends and is formed with peripherally spaced key shaped pockets 62 for carrying the keys A into superimposed position on the can ends.

The disc 61 is mounted on the upper end of a vertical actuating shaft 63 (Fig. 3) journaled in bearings formed in the table 24 and in a bracket 65 secured to the bottom face of the table. At its lower end the disc shaft 63 carries an indexing wheel 66 having a plurality of peripherally spaced indexing rollers 67 engageable with opposite sides of a helical thread cam 68 mounted on and rotating with the main driving shaft 47 for rotating the key disc 61 intermittently in time with the intermittent reciprocation of the feed bars 21 to locate a key pocket 62 of the disc over a can end at rest at the station R at the proper time.

A stack of the keys A preferably is maintained in a vertical key magazine 71 (Figs. 1, 2, 3 and 5) secured to the top of the table 24 adjacent and partially overhanging the peripheral edge of the key disc 61 and at a location remote from and preferably diametrically opposite the station R as best shown in Fig. 1 for delivering keys individually to the key pockets 62 of the disc. The keys A are cut off individually from the bottom of the stack in the magazine 71 by a cut off slide (Figs. 1, 3 and 5) of the character disclosed in United States Patent 1,958,442 issued May 15, 1934, to W. Pechy on Container Opening Key Machine. Such a cut off slide is mounted in a horizontal slideway 74 in the base of the key magazine 71 and is reciprocated toward and away from the peripheral edge of the disc 61 through a feeding stroke and thence through a return stroke in time with the partial rotations of the disc by any suitable means such as shown in the above mentioned Pechy Patent 1,958,442.

Figures 3, 4, 5, 6:
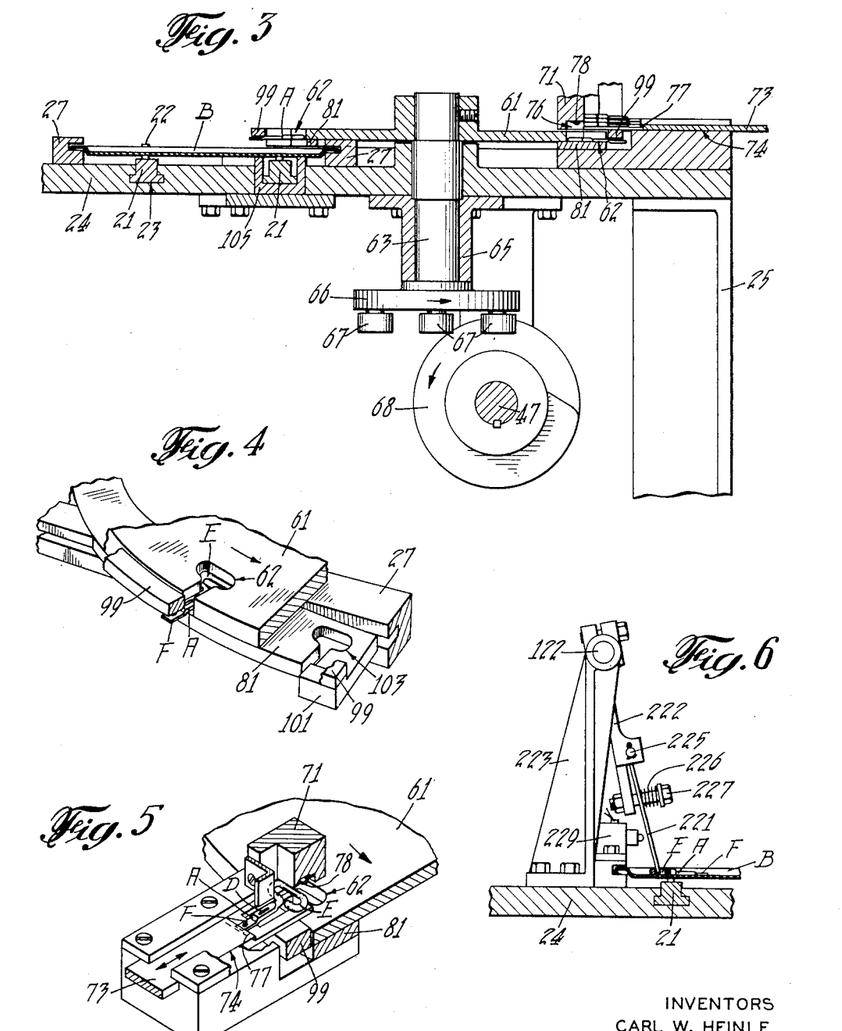
Fig. 3 is an enlarged sectional view of the key feeding devices as taken substantially along the line 3—3 in Figure 1, parts being broken away.
Figs. 4 and 5 are enlarged perspective views of details of the key feeding devices shown in Fig. 3, with parts broken away.
Fig. 6 is an enlarged sectional view of the key testing devices as taken substantially along the line 6—6 in Fig. 2, with parts broken away.

The inner end of the slide 73 partially overlaps the outer edge of the disc 61 in a clearance space 76 (Fig. 3) between the top of the disc and the bottom of the key magazine. The lowermost key A in the stack normally rests upon the top of the inner end of the slide 73 with the shank D of the key extending outwardly beyond the magazine and radially relative to the disc 61 as best shown in Fig. 5. In this position the solder tab F of the key is adjacent a raised cut off step or projection 77 on the slide 73.

During a key feeding cycle of operation of the machine, an indexing of the disc 61 stops a key pocket 62 of the disc in a position under the key magazine 71 but radially inwardly of and slightly out of vertical alignment with the keys in the magazine. While the disc is at rest between its partial rotations, the cut off slide 73 is moved inwardly toward the axis of the disc. This movement engages the raised step 77 of the slide, against the end of the key tab F (as shown in Fig. 5) and as the slide continues to move, pushes the key inwardly into vertical alignment with the positioned key pocket 62.

During this inward movement, the loop E of the key snaps under a leaf spring 78 (Figs. 3 and 5) secured to the bottom of the key magazine 71. This spring 78 holds the key against return with the slide 73 when the latter moves outwardly through its return stroke. Upon the return stroke of the slide 73, the slide rides from under the key and the key thereupon drops into the key pocket 62 of the disc 61 as shown in Fig. 3.

The key A disposed within the pocket 62 of the disc 61, is held against lateral displacement by the shape of the pocket, the loop E of the key being completely surrounded up to the key shank D, and the soldering tab F projecting radially beyond the outer periphery of the disc 61 as shown in Fig. 4. The loop E, and shank D of the key rests upon and are supported by a curved flat support rail 81 which is disposed directly under the curved path of travel of the key pockets 62 in the disc 61 and extends between and is secured to the base of the key magazine 71 and the nearest can end guide rail 27 (see Figs. 1, 3 and 4). In this supported position, the key A is advanced from the key magazine station, through preferably two idle stations, and thence into the station R where the key is in vertical alignment with the can end B to which it is to be attached.

During the advancement of the key A from the key magazine station to the station R, the bottom face of the soldering tab F of the key is fluxed to prepare the key for soldering to the can end. This key fluxing operation preferably is effected while the key is moving and is done by a fluxing device located at a fluxing station W (Fig. 1) disposed adjacent the path of travel of the keys A.

The key fluxing device preferably comprises a rotatable roller 83 (Figs. 1 and 11) which is disposed immediately below the path of travel of the projecting solder tabs F of the keys A being advanced by the disc 61. The roller 83 rotates in a bath of a suitable flux contained in a tank or flux pot 84, the roller being mounted on a short shaft 85 journaled in bearings formed in the sides of the tank and rotated by a sprocket 86 secured to the shaft in a location outside of the tank. The sprocket 86 in turn is rotated by an endless chain 87 which operates over a driving sprocket 88 carried on the continuously rotating main shaft 47.

The flux tank 84 is yieldably mounted to insure pressure of the roller 83 against the key tab F during the fluxing operation. For this purpose the tank 84 is disposed in a clearance opening 91 (Figs. 1 and 11) in the table 24 and is suspended on a pivot pin 92 which extends through an upright hinge lug 93 on the tank and a cooperating U-shaped hinge bracket 94 secured to the adjacent can end guide rail 27 as best viewed in Fig. 11. Opposite the hinge lug 93 the tank 84 is formed with an outwardly projecting support lug 96 which overlies the table 24 and carries an adjusting screw 97 which extends through the lug and is threadedly anchored in the table. A compression spring 98 interposed between the lug 96 and the table provides the yieldable element of the tank.

Hence as a key A advances along a curved path of travel with the disc 61, toward the station R, the projecting solder tab F of the key sweeps into engagement with and over the rotating fluxing roller 83 and receives therefrom a film of flux carried up from the flux tank 84. In order to insure contact of the tab F with the roller 83, the tab F rides along the under face of a curved backing-up rail 99 (Figs. 1, 3, 4 and 5) which is disposed adjacent the outer edge of the disc 61 and which extends from the key magazine 71 to the station R. The ends of the rail are secured to the base of the key magazine 71 and to a projection 101 (Fig. 4) on the key support rail 81. The backing-up rail 99 forms a rigid backing for the key tab F as the tab passes over the fluxing roller 83 and thus presses the tab against the roller under the resistance of the flux tank spring 98, thereby insuring the reception of a film of flux on the key tab.

When a fluxed key A reaches the station R as mentioned above, it registers with a key shaped opening 103 (Fig. 4) in the key support rail 81. With this registry, the key falls out of the bottom of the key pocket 62 and into and through the clearance or guide opening 103 and comes to rest on top of the waiting can end B at the station. The opening 103 serves as a guide and locating element and thus guides the falling key to a predetermined position and location on the can end as best shown in Fig. 1.

Figures 11, 12, 13:
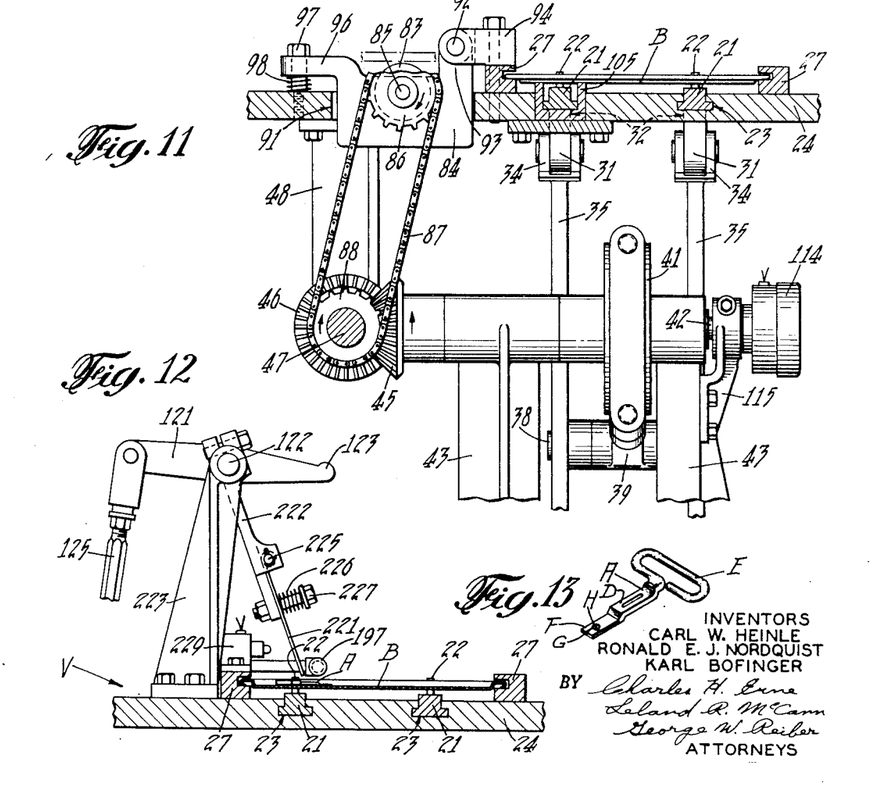
Fig. 11 is an enlarged sectional view as taken substantially along the line 11—11 in Fig. 1, with parts broken away.
Fig. 12 is a view similar to Fig. 6 showing the movable parts in a different position.
Fig. 13 is an enlarged perspective view of a key to be attached to a can end in the instant machine.

With the fluxed key A in its predetermined position on the can end B, the can end is advanced one step into the idle station S and thence through another step into the soldering station T preparatory to attaching the key to the can end. During this advancement of the can end, its superimposed key A is retained in its predetermined position and location relative to the can end, by a magnetic field which is created and maintained along the path of travel of the key with the can end. For this purpose an elongated magnet 105 (Figs. 1, 2, 3 and 11) is disposed adjacent the path of travel of the key for a distance extending from the station R to a position terminating just before the station V. This magnet preferably is a permanent horseshoe magnet having upright legs which extend up on opposite sides of one of the can end feed bars 21 as shown in Fig. 11, although an electromagnet or other shaped magnet is equally well adapted to such a use. The legs of the magnet 105 preferably are spaced apart a distance so as to register with the loop handle E and the outer end of the shank D of the key so as to obtain a maximum holding effect on the key.

The soldering of the key A to a can end B at the station T as hereinbefore mentioned preferably is effected by a vertically reciprocable soldering head 108 (Figs. 1, 2, 7 and 8) disposed above the path of travel of the can ends B along the table 24. The head 108 includes a pair of spaced soldering electrodes 111, 112 which are engageable against the top face of the fluxed soldering tab F of the key to melt the solder H in the hole G in the tab and produce a solder bond between this tab and the can end to secure the prelocated key to the can end. Melting of the solder H is effected by electric current passed through the electrodes and the key tab for a predetermined period controlled by a conventional rotary electric switch or timer 114 (Fig. 11). This timer is supported on a stationary bracket 115 bolted to the adjacent bearing bracket 43 and is actuated by the eccentric shaft 42 so as to effect soldering of the key in time with the advancement of the can ends.

Figures 7, 8:
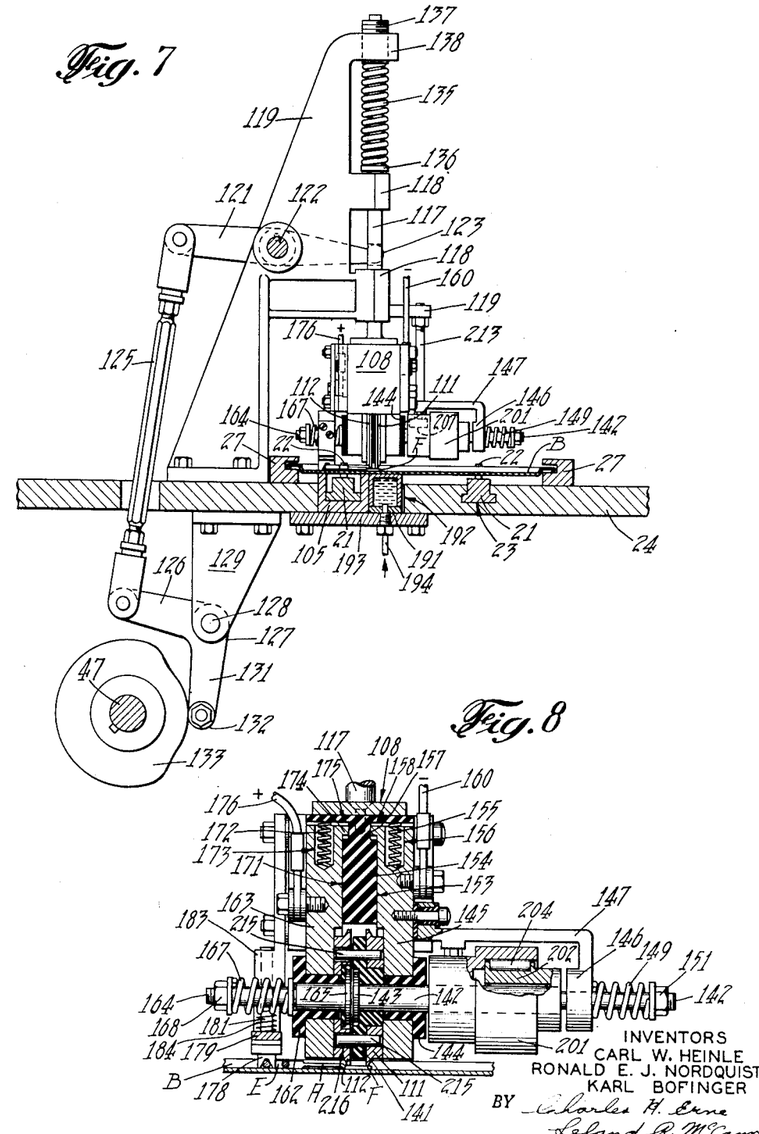
Fig. 7 is an enlarged sectional view of the soldering devices as taken substantially along the line 7—7 in Fig. 2, with parts broken away.
Fig. 8 is an enlarged sectional view of the soldering head of the devices shown in Fig. 7, with parts broken away.
Figure 9:
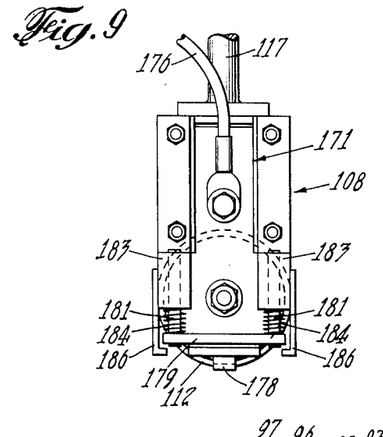
Fig. 9 is a side elevation of the soldering head shown in Fig. 8 as viewed from the left in that figure.
Figure 10:
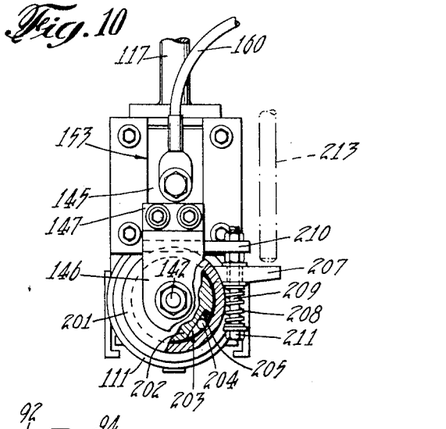
Fig. 10 is a view similar to Fig. 9 and showing the opposite side of the soldering head as viewed from the right in Fig. 8.

The soldering head 108 is attached to the lower end of a vertically reciprocable actuating rod 117 (Figs. 1, 2, 7, 8, 9 and 10) slideably mounted in a pair of spaced bearings 118 formed in a bracket 119 secured to the top of the table 24. The head 108 is reciprocated toward and away from the path of travel of the can ends B, through a soldering stroke and thence through a return stroke by a rocker arm 121 which intermediate its ends is mounted on a short pivot pin 122 carried in the bracket 119. One end of the rocker arm 121 is connected to the head actuating rod 117 in a tongue and slot universal joint 123 (Fig. 7).

The opposite end of the arm is connected by a link 125 to a leg 126 of a bell crank 127 mounted on a pivot shaft 128 carried in a bracket 129 depending from the under side of the table 24. A second leg 131 of the bell crank 127 carries a cam roller 132 which operates against an edge cam 133 mounted on and rotating with the main shaft 47. The roller 132 is held against the edge cam 133 by a compression spring 135 which surrounds the upper end of the head actuating rod 117 and is interposed between a collar 136 formed on the rod and an adjusting screw 137 threadedly secured in a lug 138 formed on the bracket 119. Through this connection with the main shaft 47, the soldering head 108 is lowered into key soldering position and then raised clear of the key to permit advancement of the can end B, in time with the other moving parts of the machine.

The soldering electrodes 111, 112 preferably are discs or wheels disposed on edge in side-by-side spaced relation and are rotatable in unison through partial or stepped rotations after each soldering operation to minimize burning of the electrode faces. These wheels are yieldably mounted for simultaneous engagement with the same face (upper face as seen in Figs. 7 and 8) of the key tab F and to compensate for any irregularities in the tab face. For these purposes the soldering electrode 111 is mounted on an insulating bushing 141 (Fig. 8) carried on and rotatable with a horizontally disposed electrode shaft 142 having a flat head or flange 143 which bears against the inner face of the bushing 141.

The shaft 142 is journaled in an insulating bearing 144 secured in a vertical slide 145 (see also Fig. 10) and in a remotely spaced bearing 146 formed in a bracket 147 secured to and projecting outwardly from the slide. The bracket is electrically insulated from the slide. A compression spring 149 surrounds the electrode shaft 142 beyond the bracket bearing 146 and is interposed between this bearing and a lock nut 151 on the end of the shaft to hold one side face of the soldering electrode 111 tightly against the inner face of the slide 145 for the transfer of electric current from the slide to the electrode.

The slide 145 is mounted for free sliding movement in a vertical gibbed slideway 153 (see also Fig. 10) formed in the outer face of an insulating block or member 154 of the soldering head 108. A compression spring 155 seated in a recess 156 in the top of the slide presses against the insulating block 154 and provides for yieldability of the slide during the soldering operation. The movement of the slide in its slideway 153 is limited by a stop lug 157 which projects from the inner face of the slide and normally engages against a shoulder of a recess 158 formed in the insulating block. Electric current is supplied to the slide 145 from any suitable source of current such as a transformer 159 by a wire 160 which is connected to the slide.

In a similar manner the electrode 112 is mounted on an insulating bushing 162 (Fig. 8) which is carried in a vertical slide 163 and which forms a bearing for a short shaft 164 having a flat head or flange 165 which is insulated from the slide but which holds the electrode tight against the slide for the transfer of electric current from the slide to the electrode. The shaft head 165 is held under pressure by a compression spring 167 which surrounds the portion of the shaft 164 which extends beyond the bushing 162. The spring is interposed between the bushing and a lock nut 168 threadedly secured to the end of the shaft.

The slide 163, like the slide 145, is mounted for free sliding movement in a vertical gibbed slideway 171 (see also Fig. 9) formed in the opposite outer face of the insulating block 154 of the head 108. The slide is yieldably held in place by a compression spring 172 seated in a recess 173 in the top of the slide and is interposed between the slide and the top of the insulating block. A projection 174 on the inner face of the slide operates in a shouldered recess 175 in the insulating block to limit the travel of the slide under the pressure of the spring 172. Electric current is supplied to the slide 163 from a suitable source of supply such as the transformer 159 by a wire 176 which is connected to the slide.

The electrodes 111, 112 are spaced apart and are insulated from each other by the insulating bushing 141, the spacing being a predetermined distance which is within the length of the soldering tab F of the key A and enough to permit the electrodes to just straddle the solder filled hole G in the tab so that when the head 108 is lowered into soldering position, both electrodes 111, 112 will engage the tab F on its upper face and will be held yieldably in place by the slide springs 155, 172. In order to insure that the electrodes engage the key tab in the right place and straddle the solder filled hole G, the key is relocated longitudinally, if necessary, by a V-shaped locating element 178 (Figs. 8 and 9) which moves down with the head 108 and engages over a portion of the loop handle E of the key.

The locating element 178 is mounted on a horizontal cross bar 179, the ends of which carry upright slide pins 181 which slide in vertical bores formed in brackets 183 secured to the gibs of the slideway 171. Compression springs 184 surrounding the pins 181 and interposed between the cross bar 179 and the lower ends of the brackets 183 provide yieldability for the locating element. When the soldering head is in a raised non-soldering position the ends of the cross bar 179 engage against L-shaped stop lugs 186 which depend from the brackets 183 and thus limit the travel of the locating element 178.

With the key A properly located by the locating element 178 and the two electrodes 111, 112 engaged against the upper face of the fluxed soldering tab F of the key under pressure of the slide springs 155, 172, the timing switch 114 operates to close an electric circuit which includes the electrode wires 160, 176 and this permits electric current to flow from the slide 145 to the electrode 111, along the engaged face of the tab F of the key to the electrode 112, continuing to the slide 163 and its connected wire 176. Flow of the electric current along the tab F heats the tab and the adjacent portion of the can end B and melts the solder H in the hole G of the tab, causing the molten solder to flow by capillary attraction along the fluxed bottom face of the tab. This flow of electric current is of momentary duration as controlled by the timing switch 114.

Upon completion of the soldering operation, the molten solder is rapidly cooled to provide a solder bond between the key tab F and the can end B to hold the key in place. The magnet 105 holds the key steady while the solder cools to insure a strong bond. This cooling is effected mainly by continuous circulation of a liquid cooling medium such as brine or cold water, through a rectangular shaped cooling conduit 191 (Figs. 1, 2 and 7) which engages against the bottom face of the can end B directly below the key tab F. This conduit 191 is disposed in an elongated recess 192 formed in the table 24 and extends adjacent the magnet 105 from the soldering station T, into and through the following idle station U, and terminating midway between station U and station V. A flat plate 193 secured to the bottom of the table 24 supports the magnet 105 and the cooling conduit 191. Inlet and outlet pipes 194, 195 secured into the conduit 191 adjacent its ends (Fig. 2) provide for circulation of the cooling medium through the conduit. The pipes lead from and to any suitable source of cooling medium.

In order to expedite the cooling of the solder, the key and the can end, an auxiliary air blast cooling device is utilized to blow cool air against the key from the top of the path of travel of the can end. This device comprises an air pipe 197 (Figs. 1 and 2) which is disposed above the path of travel of the key tab F with the can end and extends from the soldering station T into and terminating in the testing station V. The pipe 197 is connected by way of a tube 198 to any suitable source of cooled air under pressure. Small apertures in the bottom of the pipe 197 discharge the cooled air against the key tab F as it moves with the can end under the length of the pipe.

After a key soldering operation, and as the soldering head 108 moves up clear of the soldered key to permit advancement of the can end B, the soldering electrodes 111, 112 are partially rotated in unison to position a new edge portion of the electrodes in soldering position for the next key and can end in the procession advancing through the soldering station. This rotation of the electrodes is brought about by a conventional free wheeling device which includes a housing 201 (Figs. 8 and 10) which is freely rotatable on the electrode shaft 142 and which encloses a collar 202 keyed to the shaft 142 for rotating the same.

The outer periphery of the collar 202 is formed with a plurality of wedge shaped notches 203 which contain rollers 204 backed-up by compression springs 205. The housing 201 is formed with a projecting arm 207 which is normally retained in a substantially horizontal position by a compression spring 208 which surrounds a pin 209 depending from a lug 210 on the bracket 147 and extending through the arm 207. A lock nut 211 on the bottom of the pin 209 holds the spring in place.

Hence when the soldering head 108 starts up through a return stroke after a soldering operation, the arm 207 engages against the lower end of a stationary actuating rod 213 (Figs. 7 and 10) suspended from the bracket 119 (Fig. 7) and thus the arm is pushed down as the head rises. This action partially rotates the housing 201 and causes the rollers 204 in the wedge shaped notches 203 of the collar 202 to wedge between the collar and the inner face of the housing 201 and thus rotate the collar with the housing. This rotates the electrode shaft 142 with the collar 202 through a partial rotation.

On the down stroke of the head 108 the arm compression spring 208 returns the arm 207 to its original position. This rotates the housing 201 on the electrode shaft 142 in a reverse direction and tends to unwedge the rollers 204, thus leaving the collar 202 stationary in its advanced partially rotated position. Such a conventional free wheeling device is shown in Figs. 11 and 12 of United States Patent 2,373,149 issued April 10, 1945, to J. C. Strickler on Sheet Feeding and Stacking Apparatus.

Rotation of the electrode shaft 142 by the free wheeling device explained above, rotates both electrodes 111, 112 in unison through their partial rotations. For this purpose the two electrode wheels 111, 112 are tied together by a plurality of driving pins 215 (Fig. 8) which are made of insulating material. The pins 215 are secured in the electrode wheel 111 and project laterally therefrom, extending through the insulating bushing 141 and into slightly larger clearance holes 216 in the second electrode wheel 112. Hence when one electrode wheel rotates, the other rotates with it.

Testing of the solder bond to insure secure attachment of the key to the can end is effected at the station V while the cooled can end and its attached key are at rest at this station. The testing is done by a finger 221 (Fig. 12) which is pivotally mounted on an arm 222 secured to the pivot shaft 122 which operates the solder head 108. This shaft 122 extends from the solder station T to the treating station V and at this latter station is journaled in a bearing bracket 223 secured to the top of the table 24 (see Figs. 6 and 12).

The testing end of the finger 221 is free and extends down adjacent the key A soldered onto a cam end B at rest at the station V. The opposite end of the finger is mounted on a pivot pin 225 carried in the arm 222. Substantially half of the length of the finger lies flatly against the arm 222 and is yieldably held in place by a compression spring 226 which presses against the finger. The spring surrounds a stud 227 which extends through the finger and is threadedly engaged in the arm 222.

The testing of a soldered key A at the station V is effected at the same time and by the same revolution of the shaft 122, as the soldering of another key A to a succeeding can end in the procession at the soldering station T. Hence when the solder head 108 at station T moves down to effect a soldering operation, the testing arm 222 at the testing station V is simultaneously rocked downwardly toward a soldered and cooled key at this station. This movement of the testing arm 222 carries the testing finger down through an arc toward the soldered key A and engages the free end of the finger into and against the loop handle E of the key as best shown in Fig. 6. If the solder bond is strong enough to properly hold the key in place further movement of the finger 221 is arrested and the over-travel of the arm 222 is taken up by the compression spring 226 as shown in Fig. 6.

If the solder bond does not hold and the spring 226 is strong enough to break the key A loose from the can end, the finger 221 continues its movement with the arm 222 and engages against and actuates an electric switch 229 connected with the electromagnetic clutch 52 hereinbefore mentioned to disconnect the motor drive from the main drive shaft 47 and thus stop the machine for the removal of the can end B with the broken off key. This testing of the solder bond of the key completes the cycle of operation of the machine. Can ends having securely attached and tested keys A are discharged from the end of the machine to any suitable place of deposit.

It is thought that the invention and many of its attendant advantages will be understood from the foregoing description, and it will be apparent that various changes may be made in the form, construction and arrangement of the parts without departing from the spirit and scope of the invention or sacrificing all of its material advantages.

We claim:

1. In a machine for attaching solder carrying opening keys to can ends, the combination of a support for a can end having an opening key loosely superimposed thereon, a soldering head disposed adjacent said support, a pair of spaced and parallel slide members yieldably mounted in said head and separately connected with a source of electric current, a pair of rotary electrodes disposed in laterally spaced relation for edgewise engagement simultaneously against a single face of said key, said electrodes being mounted rotatably one in each of said slide members, pressure means acting against each of said electrodes for retaining them in electrical contact with their slide members, means for effecting relative movement between said head and said support for yieldably engaging said electrodes against said single face of said key to heat said key through electrical resistance to melt said solder and effect a bond between said key and said can end, and means for rotating said electrodes through partial stepped rotations after each soldering operation.

2. In a machine of the character defined in claim 1 wherein the electrodes are mounted on independent flanged shafts carried separately in the slide members and maintained under axial pressure for retaining the electrodes in rotatable and electrical contact with said slide members.

3. In a machine of the character defined in claim 1 wherein the electrodes are transversely insulated from each other and are loosely tied together for rotation in unison and independent radial movement and wherein means are provided for rotating one of said electrodes to rotate both of them through partial stepped rotations.

4. In a machine for attaching solder carrying opening keys to can ends, the combination of a support for can ends having opening keys loosely superimposed thereon, feeding devices for advancing the can ends along said support in spaced and timed processional order along a predetermined path, means for intermittently actuating said feeding devices, means for feeding a key to a predetermined position on each of said can ends, magnetic means adjacent said path of the can ends for retaining said keys in said predetermined positions on said advancing can ends, a soldering head disposed adjacent the path of travel of said can ends, a pair of electrodes spaced laterally relative to each other on said head and connected with a source of electric current, and means for moving said head toward and away from the path of travel of said can ends in time with the advancement of said can ends to engage both of said electrodes against the same face of the key superimposed upon a can end at rest between advancements to heat said key through electrical resistance to melt the solder carried thereon and effect a bond between said key and said can end.

5. In a machine for attaching solder carrying opening keys to can ends, the combination of a support for can ends, feeding devices for advancing the can ends along said support in spaced and timed processional order, means for intermittently actuating said feeding devices, means for applying a film of flux to the solder carrying portion of the key to be attached to said can ends, means for feeding said fluxed keys into a predetermined loosely superimposed position on said advancing can ends, magnetic means disposed adjacent the path of travel of said can ends for retaining said keys in position on said advancing can ends, a soldering head disposed adjacent the path of travel of said can ends, a pair of electrodes spaced laterally relative to each other on said head and connected with a source of electric current, and means for moving said head toward and away from the path of travel of said can ends in time with the advancement of said can ends to engage both of said electrodes against the same face of the key superimposed upon a can end at rest between advancements to heat said key through electrical resistance to melt the solder carried thereon and effect a bond between said key and said can end.

6. In a machine for attaching solder carrying opening keys to can ends, the combination of a support for can ends having opening keys loosely superimposed thereon, feeding devices for advancing the can ends along said supports in spaced and timed processional order, means for intermittently actuating said feeding devices, magnetic means adjacent the path of travel of said ends for retaining said keys in position on said advancing can ends, a soldering head disposed adjacent the path of travel of said can ends, a pair of electrodes spaced laterally relative to each other on said head and connected with a source of electric current, means for moving said head toward and away from the path of travel of said can ends in time wth the advancement of said can ends to engage both of said electrodes against the same face of the key superimposed upon a can end at rest between advancement to heat said key through electrical resistance to melt the solder carried thereon, means for cooling said melted solder to effect a bond between said key and said can end, and means engageable with a soldered key for testing the strength of said solder bond to insure secure attachment of said key to said can end said magnetic means extending along the path of said can ends and terminating adjacent said cooling means whereby its magnetic attraction does not oppose the action of said testing means.

7. In a machine for attaching solder carrying opening keys to can ends, the combination of a support for can ends having opening keys loosely superimposed thereon, feeding devices for advancing the can ends along said support in spaced and timed processional order, means for intermittently actuating said feeding devices, magnetic means adjacent the path of said can ends for retaining said keys in position on said advancing can ends, a soldering head disposed adjacent the path of travel of said can ends, a pair of electrodes spaced laterally relative to each other on said head and connected with a source of electric current, means for moving said head toward and away from the path of travel of said can ends in time with the advancement of said can ends to engage both of said electrodes against the same face of the key superimposed upon a can end at rest between advancement to heat said key through electrical resistance to melt the solder carried thereon, a conduit through which a liquid cooling medium is circulated extending along the path of travel of said can ends in contact with one face of said can ends for cooling said melted solder to effect a bond between said key and said can end, and an air blast device disposed adjacent the opposite face of said can ends and directing cooled air against said melted solder to expedite the cooling thereof, said blast of cooling air against one face and the attraction of said magnetic means on the opposite face of said can ends in addition to their aforesaid functions combining to hold said can ends in close contact with said conduit to assure an efficient cooling effect.

8. In a machine for attaching solder carrying opening keys to can ends, the combination of a support for can ends having opening keys loosely superimposed thereon, feeding devices for advancing the can ends along said support in spaced and timed processional order, means for intermittently actuating said feeding devices, magnetic means adjacent the path of said can ends for retaining said keys in position on said advancing can ends, a soldering head disposed adjacent the path of travel of said can ends, a pair of electrodes spaced laterally relative to each other on said head and connected with a source of electric current, means for moving said head toward and away from the path of travel of said can ends in time with the advancement of said can ends to engage both of said electrodes against the same face of the key superimposed upon a can end at rest between advancements to heat said key through electrical resistance to melt the solder carried thereon and effect a bond between said key and said can end, a pivotally mounted arm disposed adjacent the path of travel of said can ends, means for swinging said arm toward and away from said path of travel of said can ends in time with the advancement of said can ends, a testing finger yieldably mounted on said arm and having its free end engageable with a soldered key on a can end to exert a yieldable lateral pressure thereagainst to test the strength of said solder bond, and electric means engageable by said finger under failure of said bond to stop said machine for the ejection of said keyless can end, said magnetic means extending along the path of said can ends but terminating at a distance from said testing finger whereby its magnetic attraction does not oppose the testing pressure applied by said finger against the key.

9. In a machine for attaching solder carrying opening keys to can ends, the combination of a support for can ends having opening keys loosely superimposed thereon, feeding devices for advancing the can ends along said support in spaced and timed processional order, means for intermittently actuating said feeding devices, means for retaining said keys in position on said advancing can ends, a soldering head disposed adjacent the path of travel of said can ends, a pair of electrodes spaced laterally relative to each other on said head and connected with a source of electric current, means for moving said head toward and away from the path of travel of said can ends in time with the advancement of said can ends to engage both of said electrodes against the same face of the key superimposed upon a can end at rest between advancement to heat said key through electrical resistance to melt the solder carried thereon and effect a bond between said key and said can end, means extending along the path of travel of said can ends for cooling said melted solder as the can ends advance in processional order to effect a bond between said key and said can end, and magnet means disposed along the path of travel of said can ends to hold a soldered key against shifting relative to its advancing can end during the solder cooling operation to facilitate strong bonding of said key to said can end.

10. In a machine for attaching solder carrying opening keys to can ends, the combination of a support for a can end having an opening key loosely superimposed thereon, a soldering head disposed adjacent said support, a pair of spaced and parallel slide members yieldably mounted in said head, a pair of electrodes mounted one on each of said slide members and disposed in spaced relation for engagement simultaneously against a single face of said key, said electrodes being connected to a source of electric current, means for effecting relative movement between said head and said support for engaging said electrodes against said single face of said key to heat said key through electrical resistance to melt said solder and effect a bond between said key and said can end, and a locating element yieldably mounted on said head and movable with said head, said locating element having a V-shaped portion adapted to engage over a part of said key for aligning and holding said key in position for the soldering operation.

11. In a machine for attaching solder carrying opening keys to can ends, the combination of a support for a can end having an opening key loosely superimposed thereon, a soldering head disposed adjacent said support, said head comprising a pair of spaced yieldably mounted members, a pair of rotary electrodes electrically insulated from each other and separately connected with a source of electric current and disposed in laterally spaced relation for edgewise engagement simultaneously against a single face of said key, said electrodes being mounted rotatably one on each of said yieldably mounted members, means for effecting relative movement between said yieldably mounted members and said support for yieldably engaging said electrodes against a single face of said key to pass current through said key to heat the same through electrical resistance to melt said solder and effect a bond between said key and said can end, and means for intermittently rotating said electrodes through partial stepped rotations to distribute the wear around their key contacting surfaces.

12. In a machine for attaching a solder carrying opening key to a can end, the combination of means for advancing a can end along a predetermined path of travel, means for conveying a key towards said path of travel with a surface of its solder carrying portion exposed, means for applying flux to said exposed surface as said key is moved towards said path of travel while leaving its opposite surface substantially free of flux, means for positioning said key against one side of said can end with its fluxed surface adjacent said can end, magnetic means disposed along said path of travel adjacent the other side of said can end for retaining said key in position on said can end as said end is advanced along said path of travel, a pair of electrodes spaced laterally relative to each other and disposed adjacent the path of travel of said ends, and means for moving said electrodes into engagement against said flux-free surface of said solder carrying portion of said key to pass an electric current through said solder carrying portion to heat said portion to melt the solder carried thereon and effect a bond between said key and said can end.

13. method of soldering to a can part an opening key having a tab provided with an aperture in which is secured a piece of solder, comprising positioning said key on said can part, engaging the surface of said tab with a pair of electrodes spaced apart so that said electrodes straddle the solder containing aperture, passing electric current through said electrodes and along the portion of said tab between said electrodes to heat said tab portion by electrical resistance and to melt said solder, and simultaneously maintaining said tab and said can part in face to face engagement to effect transference of heat from said electrically heated tab to said can part by conductance to facilitate the formation of a solder bond between said key and said can part.

(References on following page)

References Cited in the file of this patent

UNITED STATES PATENTS

| | | |
|---|---|---|
| 1,142,306 | Clemens | June 8, 1915 |
| 1,264,611 | Cleveland | Apr. 30, 1918 |
| 1,536,838 | Geisenhoner | May 5, 1925 |
| 1,635,536 | Butler | July 12, 1927 |
| 1,699,091 | Butler | Jan. 15, 1929 |
| 1,743,519 | Bardet et al. | Jan. 14, 1930 |
| 1,773,892 | Toleik | Aug. 26, 1930 |
| 1,861,970 | Meadowcroft | June 7, 1932 |
| 1,884,683 | Hermani | Oct. 25, 1932 |
| 1,890,262 | Pardew | Dec. 6, 1932 |
| 1,922,916 | Hermani | Aug. 15, 1933 |
| 2,002,105 | Bardet et al. | May 21, 1935 |
| 2,231,408 | Fechheimer et al. | Feb. 11, 1941 |
| 2,338,002 | Mero | Dec. 28, 1943 |